(12) United States Patent
Hamrani et al.

(10) Patent No.: US 11,491,569 B1
(45) Date of Patent: Nov. 8, 2022

(54) MULTIDIRECTIONAL SYNCHRONIZED ULTRASONIC DEVICES AND METHODS FOR ASSISTING WIRE ARC ADDITIVE MANUFACTURING

(71) Applicants: Abderrachid Hamrani, Miami, FL (US); Arvind Agarwal, Miami, FL (US); Tanaji Paul, Miami, FL (US)

(72) Inventors: Abderrachid Hamrani, Miami, FL (US); Arvind Agarwal, Miami, FL (US); Tanaji Paul, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/805,777

(22) Filed: Jun. 7, 2022

(51) Int. Cl.
| | |
|---|---|
| *B23K 9/04* | (2006.01) |
| *B23K 20/10* | (2006.01) |
| *B33Y 30/00* | (2015.01) |
| *B23K 9/095* | (2006.01) |
| *B33Y 10/00* | (2015.01) |
| *B33Y 50/00* | (2015.01) |

(52) U.S. Cl.
CPC .............. *B23K 9/04* (2013.01); *B23K 9/0956* (2013.01); *B33Y 10/00* (2014.12); *B33Y 30/00* (2014.12); *B33Y 50/00* (2014.12)

(58) Field of Classification Search
CPC .... B23K 9/04–048; B23K 9/095–0956; B23K 9/1093; B23K 9/124–125; B23K 9/295; B23K 20/10; B23K 1/06; B33Y 10/00; B33Y 30/00
See application file for complete search history.

(56) References Cited

U.S. PATENT DOCUMENTS

| | | | |
|---|---|---|---|
| 9,808,883 B2 | 11/2017 | Ballough et al. | |
| 10,661,341 B2* | 5/2020 | Romano | B29C 64/153 |
| 10,941,464 B1 | 3/2021 | Agarwal et al. | |

(Continued)

FOREIGN PATENT DOCUMENTS

| | | |
|---|---|---|
| CN | 102059453 | 5/2011 |
| CN | 105127668 | 12/2015 |
| CN | 113199130 | 8/2021 |

OTHER PUBLICATIONS

Tanaji Paul et al., Correlations to Predict Microstructure and Mechanical Properties of Ultrasonically Cast Metal Matrix Nanocomposites as a Function of Treatment Time, Advanced Engineering Materials, 2020, 22, 2000413, 10 pages.

(Continued)

*Primary Examiner* — Michael A Laflame, Jr.
(74) *Attorney, Agent, or Firm* — Saliwanchik, Lloyd & Eisenschenk

(57) ABSTRACT

Devices and methods to assist wire arc additive manufacturing (WAAM) are provided. A non-contact, multidirectional synchronized ultrasonic device can include multiple ultrasonic probes mounted on a nozzle of a WAAM robotic arm. The probes can include one normal probe and a plurality of lateral probes configured to rotate on a parabolic frame. The ultrasonic probe in the normal direction can act by its continual high-frequency oscillation in the arc plasma to enhance the arc push force, while the lateral probes can act on the shape of both sides of the deposit. The combined effect of the probes can generate ultrasonic waves and cavitation in the molten pool.

20 Claims, 2 Drawing Sheets

(56) References Cited

U.S. PATENT DOCUMENTS

2013/0089642 A1* 4/2013 Lipson ................ B29C 64/106
426/115
2018/0117718 A1* 5/2018 Rajagopalan ........ B23K 9/0284

OTHER PUBLICATIONS

Tanaji Paul et al., Analytical Review of Reinforcement Addition Techniques during Ultrasonic Casting of Metal Matrix Composites, Advanced Engineering Materials, 2020, 22, 2000524, 19 pages.

* cited by examiner

MULTIDIRECTIONAL SYNCHRONIZED ULTRASONIC DEVICES AND METHODS FOR ASSISTING WIRE ARC ADDITIVE MANUFACTURING

GOVERNMENT SUPPORT

This invention was made with government support under W911NF2020256 awarded by the Army Research Laboratory. The government has certain rights in the invention.

BACKGROUND

Wire arc additive manufacturing (WAAM) is a technique used to produce metal components by melting and depositing a wire layer by layer, maneuvered by a controlled robotic arm. This process leads to an inherent buildup of heat and a slow cooling rate, resulting in the formation of large, millimeter-sized grains in the component. In order to manufacture parts with high strength, it is necessary to refine the grain size such that higher grain boundary area or volume can resist deformation.

BRIEF SUMMARY

Embodiments of the subject invention provide novel and advantageous devices and methods to assist wire arc additive manufacturing (WAAM). A non-contact, multidirectional synchronized ultrasonic device can include multiple ultrasonic probes mounted on a nozzle of a WAAM robotic arm (e.g., on the welding torch). The probes can include one normal probe and a plurality (e.g., 2 to 6) of probes configured to rotate on a parabolic frame. The ultrasonic probe in the normal direction can act by its continual high-frequency oscillation in the arc plasma to enhance the arc push force, while the probes in the lateral directions (on the parabolic frame) can act on the shape of both sides of the deposit. The combined effect of the probes can generate ultrasonic waves and cavitation on the molten metal pool, thereby refining the microstructure and improving the mechanical performance of the deposited material. The multidirectional synchronized ultrasonic device can also ensure a full overflow of shielding gases in the molten metals, which reduces the appearance of defects and air cavities or porosity inside the material.

In an embodiment, a multidirectional synchronized ultrasonic device to assist WAAM can comprise: a frame comprising a collar, a first curved section extending from the collar, and a second curved section extending from the collar; a normal ultrasonic probe connected to the collar and configured to be coaxial with a nozzle of a WAAM device; and a plurality of lateral ultrasonic probes comprising a first lateral ultrasonic probe disposed on the first curved section of the frame and a second lateral ultrasonic probe disposed on the second curved section of the frame. Each lateral ultrasonic probe of the plurality of ultrasonic probes can be disposed such that it is not coaxial with the normal ultrasonic probe. The multidirectional synchronized ultrasonic device can be configured to be disposed over at least a portion of the nozzle of the WAAM device. The frame can be configured to rotate about a central axis of the normal ultrasonic probe (and/or a central axis of the nozzle of the WAAM device) and/or within a plane in which the central axis of the normal ultrasonic probe (and/or the central axis of the nozzle of the WAAM device) lies. The first curved section of the frame and/or the second curved section of the frame can (each) have a parabolic shape. The first lateral ultrasonic probe can be disposed such that its central axis is perpendicular to that of the normal ultrasonic probe (and/or the central axis of the nozzle of the WAAM device). The second lateral ultrasonic probe can be disposed such that its central axis is perpendicular to that of the normal ultrasonic probe (and/or the central axis of the nozzle of the WAAM device) and/or parallel to that of the first lateral ultrasonic probe. The plurality of lateral ultrasonic probes can further comprise a third lateral ultrasonic probe disposed on the first curved section of the frame and a fourth lateral ultrasonic probe disposed on the second curved section of the frame. A distance between the first lateral ultrasonic probe and the third lateral ultrasonic probe can be the same as a distance between the second lateral ultrasonic probe and the fourth lateral ultrasonic probe. The plurality of lateral ultrasonic probes can further comprise a fifth lateral ultrasonic probe disposed on the first curved section of the frame and a sixth lateral ultrasonic probe disposed on the second curved section of the frame. The first lateral ultrasonic probe can be disposed between the third lateral ultrasonic probe and the fifth lateral ultrasonic probe on the first curved section of the frame, and the second lateral ultrasonic probe can be disposed between the fourth lateral ultrasonic probe and the sixth lateral ultrasonic probe on the second curved section of the frame. The distance between the first lateral ultrasonic probe and the third lateral ultrasonic probe can be the same as the distance between the second lateral ultrasonic probe and the fourth lateral ultrasonic probe, a distance between the first lateral ultrasonic probe and the fifth lateral ultrasonic probe, and/or a distance between the second lateral ultrasonic probe and the sixth lateral ultrasonic probe. The normal ultrasonic probe and each lateral ultrasonic probe of the plurality of lateral ultrasonic probes can each comprise a transducer in operable communication with an ultrasonic power source (which can be part of the multidirectional synchronized ultrasonic device or part of the WAAM device). Each transducer can be configured to be controlled by the ultrasonic power source with a power in a range of from 700 Watts (W) to 2000 W and/or a frequency in a range of from 18 kilohertz (kHz) to 20 kHz. Each transducer can be configured to be operated by an ultrasonic power source in a first mode of being switched on continuously and a second mode of being pulsed on and off in repetitive cycles.

In another embodiment, a WAAM device can comprise: a WAAM robotic arm comprising a nozzle; and a multidirectional synchronized ultrasonic device as described herein, disposed over at least a portion of the nozzle (e.g., disposed such that a tip of the nozzle protrudes out of the normal ultrasonic probe).

In another embodiment, a method of performing WAAM can comprise: providing a WAAM device as described herein; printing a metal through the nozzle of the WAAM device (e.g., using the WAAM robotic arm), the metal forming a molten pool as it exits the nozzle; and operating (e.g., via the ultrasonic power source) the normal ultrasonic probe and the plurality of lateral ultrasonic probes (e.g., the transducers of the normal ultrasonic probe and each lateral ultrasonic probe of the plurality of lateral ultrasonic probes) to generate ultrasonic waves and cavitation on the metal molten pool. The operation of the transducers can comprise controlling (e.g., via the ultrasonic power source) the transducers with a power in a range of from 700 W to 2000 W and/or a frequency in a range of from 18 kHz to 20 kHz. The operating of the transducers can comprise operating (e.g., via the ultrasonic power source) the transducers in a first mode of being switched on continuously and a second mode of being pulsed on and off in repetitive cycles. The method can further comprise rotating the frame to move the plurality of lateral ultrasonic probes with respect to the molten metal pool (e.g., rotating the frame about a central axis of the normal ultrasonic probe (and/or a central axis of the nozzle of the WAAM device) and/or within a plane in which the central axis of the normal ultrasonic probe (and/or the central axis of the nozzle ofthe WAAM device) lies).

BRIEF DESCRIPTION OF DRAWINGS

FIG. 1A shows a view of the entire device; FIG. 1B shows a zoomed-in view of the section highlighted with the box in FIG. 1A; and FIG. 1C shows a zoomed-in view of the section highlighted with the box in FIG. 1B.

DETAILED DESCRIPTION

Embodiments of the subject invention provide novel and advantageous devices and methods to assist wire arc additive manufacturing (WAAM). A non-contact, multidirectional synchronized ultrasonic device can include multiple ultrasonic probes mounted on a nozzle of a WAAM robotic arm (e.g., on the welding torch). The probes can include one normal probe and a plurality (e.g., 2 to 6) of probes configured to rotate on a parabolic frame. The ultrasonic probe in the normal direction can act by its continual high-frequency oscillation in the arc plasma to enhance the arc push force, while the probes in the lateral directions (on the parabolic frame) can act on the shape of both sides of the deposit. The combined effect of the probes can generate ultrasonic waves and cavitation on the molten pool, thereby refining the microstructure and improving the mechanical performance of the deposited material. The multidirectional synchronized ultrasonic device can also ensure a full overflow of shielding gases in the molten metal, which reduces the appearance of defects and air cavities or porosity inside the material.

Figures 1A, 1B, 1C:
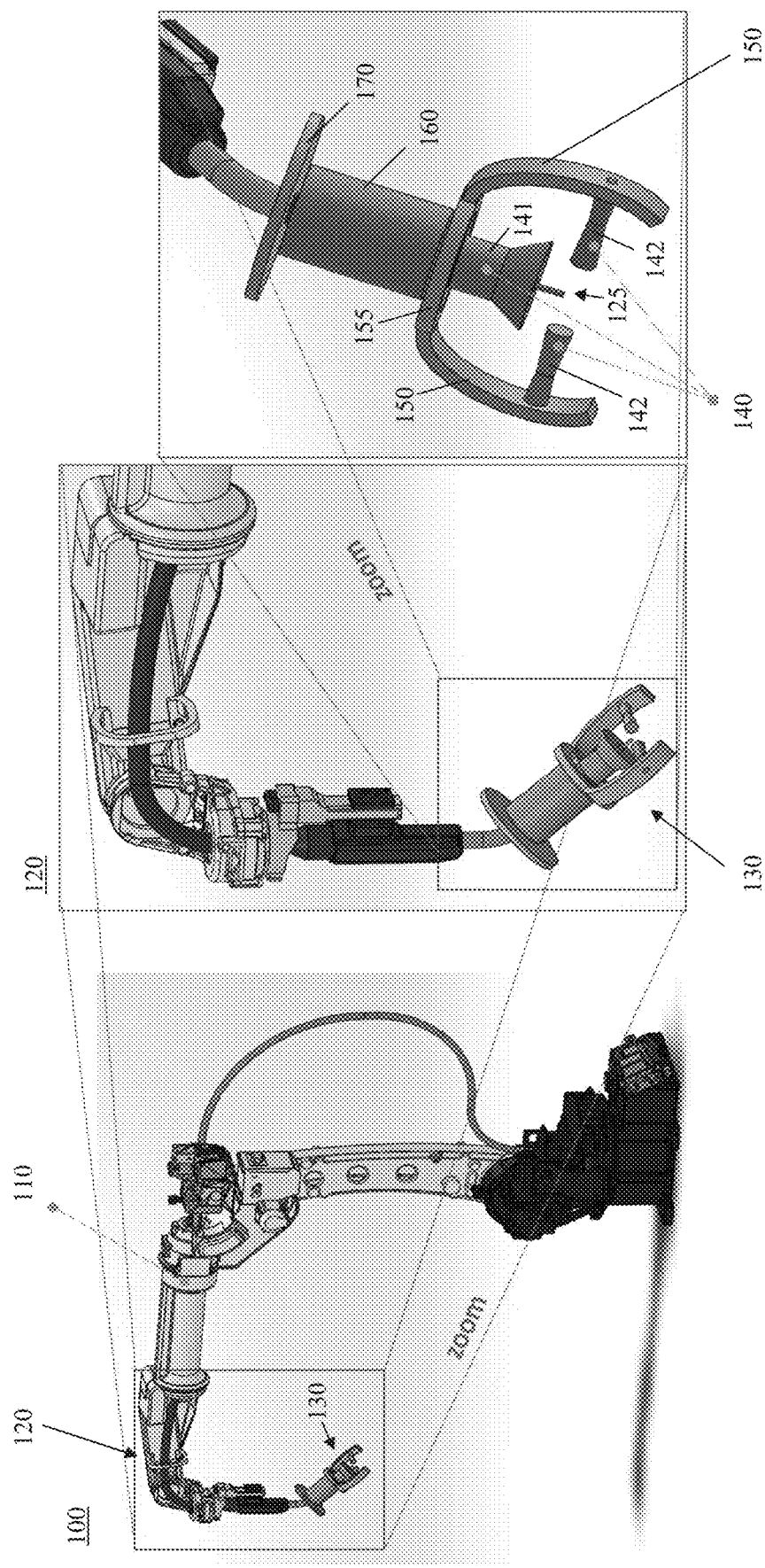
FIGS. 1A-1C show schematic views of a multidirectional synchronized ultrasonic wire arc additive manufacturing (MSU-WAAM) device, according to an embodiment of the subject invention.
Figure 2:
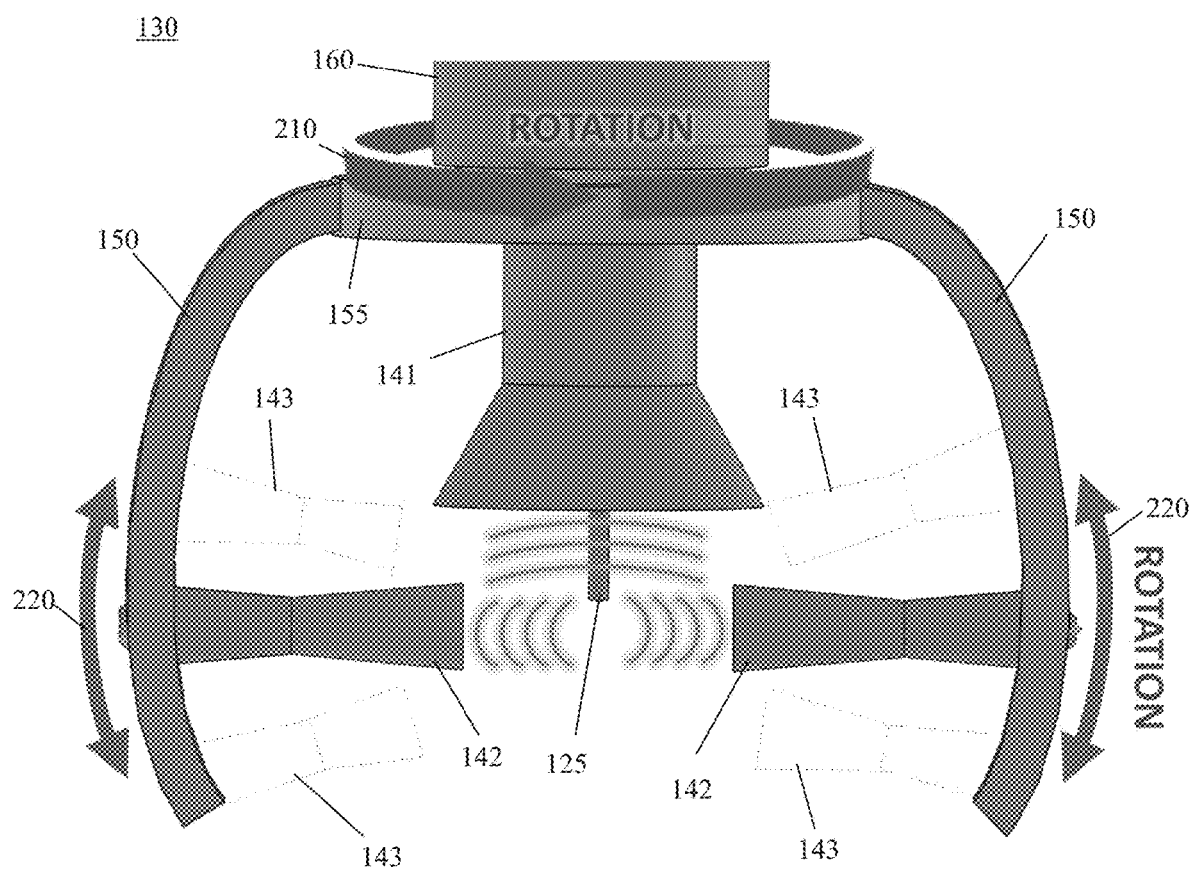
FIG. 2 shows a schematic view of a portion of the MSU-WAAM device, according to an embodiment of the subject invention, showing a detailed representation of the working mechanism.

FIGS. 1A-1C show schematic views of a multidirectional synchronized ultrasonic wire arc additive manufacturing (MSU-WAAM) device 100, according to an embodiment of the subject invention; and FIG. 2 shows a schematic view of the multidirectional synchronized ultrasonic device 130. Referring to FIGS. 1A-1C, the WAAM robot or robotic arm 110 can have the (non-contact) multidirectional synchronized ultrasonic device 130 mounted on (or over) a nozzle 125 of a distal section 120 of the WAAM robot or robotic arm 110. The multidirectional synchronized ultrasonic device 130 can include multiple probes 140, including a normal probe 141 and lateral probes 142 (e.g., 2 to 6 or more lateral probes) disposed on a frame 150 (e.g., a parabolic frame, which can include two frame sections as seen in FIG. 1). The lateral probes 142 can be disposed such that their long axis is perpendicular to that of the normal probe 141. That is, the lateral probes 142 point in a direction perpendicular to that in which the normal probe 141 points. In an embodiment, this can be the case for some (e.g., two) of the lateral probes 142, while if additional lateral probes 143 (see FIG. 2) are included, they may not be disposed such that their long axis is perpendicular to that of the normal probe 141. A tip portion of the nozzle 125 can protrude out of the normal probe 141.

The normal probe 141 can be disposed such that its long axis is parallel to that of the wire (and the nozzle 125 and/or the cylindrical portion 160). The lateral probes 142 can be disposed such that their respective long axes are in a plane perpendicular to the axis of the wire (and the nozzle 125 and/or the cylindrical portion 160). The lateral probes 142 can be disposed equidistant from one another. Each probe 140 can include a transducer, and the transducer in each of the probes 140 can be independently controlled from an ultrasonic power source in operable communication with the probes 140. The power input to each of the transducers of the probes 140 can be controlled in a range of, for example, from 700 Watts (W) to 2000 W. The frequency of vibration in each transducer of the probes 140 can be controlled in a range of, for example, from 18 kilohertz (kHz) to 20 kHz. Each of the transducers of the probes 140 can be operated in two modes. A first mode of the transducers keeps them switched on continuously, and a second mode of the transducers operates them in a pulsed mode where they are on and off in repetitive cycles. The duration of on and off times in the second mode can be independently controlled by the power source.

The frame 150 can be connected to a first collar 155 (which can either be monolithically formed with the frame 150 and therefore part of the frame 150 or separately formed from the frame 150 and therefore a separate element from the frame 150), which can be connected to the nozzle 125, a cylindrical portion 160, and/or the normal probe 141. In some embodiments, the normal probe 141 can be connected directly to the nozzle 125 and/or the cylindrical portion 160; alternatively, or in addition, the normal probe 141 can be connected directly to the first collar 155. The first collar 155 and a second collar 170 (e.g., connected to the cylindrical portion 160) of the device 100 can be made of the same material or of different material. Referring to FIG. 2, the frame 150 can be configured to rotate 210 about the central axis of the nozzle 125 (and/or the central axis of the cylindrical portion 160), and the lateral probes 142 can therefore be configured to rotate 210 about the central axis of the nozzle 125 (and/or the central axis of the cylindrical portion 160) because they are disposed on the frame 150. The frame 150 can also be configured to rotate 220 in both directions within the plane in which the central axis of the nozzle 125 (and/or the central axis of the cylindrical portion 160) lies.

During a WAAM process, the ultrasonic probe 141 in the normal direction can act by its continual high-frequency oscillation in the arc plasma to enhance the arc push force, while the lateral probes 142 can act on the shape of both sides of the deposit. The combined effect of the probes 140 can generate ultrasonic waves and cavitation on the molten metal pool, thereby refining the microstructure and improving the mechanical performance of the deposited material. The multidirectional synchronized ultrasonic device 100 can also ensure a full overflow of shielding gases in the molten metals, which reduces the appearance of defects and air cavities or porosity inside the material.

Embodiments of the subject invention provide devices for in situ refinement and strengthening of large-scale three-dimensional (3D) printed metal components in real-time during WAAM. The devices: employ non-contact ultrasonication to the molten wire during WAAM; induce ultrasonication from at least two directions that are mutually perpendicular using a plurality of ultrasonic probes (e.g., including a normal probe and 2-6 lateral probes); reduce grain size and strengthen 3D printed metal parts processed by WAAM; reduce porosity and heat affected zones in metallic parts processed by WAAM; and enable manufacturing of a wide range of metals (e.g., aluminum, titanium, iron, magnesium, and their alloys and composites).

The MSU-WAAM device 100 can include a non-contact, multidirectional synchronized ultrasonic device 130 to assist WAAM. The device can assist with forming the deposit as well as solving the problems of defects such as high porosity, large heat-affected zones, and low strength. The multidirectional synchronized ultrasonic device 130 can provide non-contact, ultrasonic cavitation in a molten metallic wire during WAAM. Ultrasonication is induced from multiple, mutually perpendicular directions for additive manufacturing of large-scale metallic parts with sizes of the order of a few meters (e.g., at least 2 meters). The multidirectional synchronized ultrasonic device 130 refines the microstructure of components processed by WAAM, reducing their grain size, and thereby enhancing their strength. Manufacturing defects such as porosity and heat-affected zones are reduced along with additional flexibility for applications to a large range of metallic systems, including but not necessarily limited to magnesium, aluminum, titanium, iron, and their alloys and composites.

The aerospace and automotive industries employ structural components such as rockets and chassis that are required to bear high loads while simultaneously having low fuel consumption. This necessitates metallic parts that have high strength and are lightweight. Aluminum and titanium are suitable due to their low density and high strength. These components need to be manufactured in large sizes with complex geometries with fine structures having high load-carrying capacity.

As discussed in the Background, in order to manufacture parts with high strength, it is necessary to refine the grain size such that higher grain boundary area or volume can resist deformation. Related art methods to refine grain structures of metals produced by WAAM are all post-processing mechanical and thermal treatments that are expensive and time-consuming.

In contrast, embodiments of the subject invention provide direct, non-contact ultrasonication in the molten wire feed during WAAM. Each of the ultrasonic probes 140 uses a combination of electric and magnetic fields to induce ultrasonic cavitation. The two fields (i.e., one from the normal probe 141 and one from the lateral probes 142) are oriented mutually perpendicular to each other, and Lorentz forces result in cavitation without physical contact with the probes 140. This enables direct cavitation in the wire feed and improves on related art methods and devices by eliminating the need to ultrasonicate the molten metal deposit or the substrate by indirect, contact methods. This also helps to ultrasonicate deposits with complex geometries and components employed in less accessible areas (e.g., in the marine and/or nuclear industries).

Embodiments of the subject invention utilize multidirectional ultrasonic cavitation to process large parts by additive manufacturing. The normal probe 141 can be oriented with its long axis coaxial with the wire feed (i.e., coaxial with the nozzle 125 (and/or the cylindrical portion 160)), and the lateral probes 142 can be oriented with their respective long axes perpendicular to the wire feed (i.e., perpendicular to the central axis of the nozzle 125 (and/or the central axis of the cylindrical portion 160)), inducing cavitation in all three mutually orthogonal directions. Thus, instead of sonicating a single weld bead, this orientation can continuously sonicate a large pool of molten metal with complex geometry. This is particularly useful for large-scale additive manufacturing of large parts with dimensions on the order of several meters. Further, the multidirectional ultrasonic probes 140 process the deposited weld not only from the top but also from both lateral sides and act on the melt's free surface to provide a unique way to shape the weld bead. The synchronization of the powers and directions of the ultrasonic waves according to the geometry of the deposited material as well as the movements of the WAAM robotic arm 110 contributes to the success of the MSU-WAAM device 100 technique and distinguishes it from related art, classical, ultrasonic-assisted wire arc welding processes.

Embodiments of the subject invention allow for additive manufacturing of stronger metals with refined microstructures. Multidirectional ultrasonication induces pressure waves inside the molten metal with alternating cycles of compression and rarefaction. The reduction in pressure during rarefaction leads to the formation of heterogeneous nucleation sites, and solidification of the metal at these sites results in a refined microstructure with smaller grain sizes. Ultrasonication can reduce grain sizes to hundreds of micrometers ($\mu m$) (e.g., less than 1 millimeter (mm)) as compared to a few mm without it. This reduced grain size results in stronger metals with higher yield strength and higher ultimate tensile strength.

Embodiments of the subject invention achieve metal melt pools with reduced porosity and heat-affected zones. Ultrasonic cavitation results in pressure waves that transmit residual heat faster. The melt thus solidifies before the heat can spread outside, and, as a result, the volume of heat-affected zones, which are areas of weakness in the additively manufactured component, is reduced. Cavitation also releases trapped gases from the molten melt pool resulting in a higher density of the additive manufactured product.

The MSU-WAAM devices of embodiments of the subject invention allow for multidirectional ultrasonic WAAM, which is a flexible additive manufacturing process. Ultrasonication can be utilized for manufacturing a wide range of metals (e.g., magnesium, aluminum, titanium, iron, and their alloys and composites), and cavitation can be utilized to disintegrate and distribute reinforcement particles in the molten pool in situ during additive manufacturing. Hence, this technology can be employed to manufacture metals and composites by WAAM.

Embodiments of the subject invention provide devices and methods for: non-contact ultrasonication of molten feed wire; multidirectional ultrasonic cavitation employed in situ during WAAM; refinement of microstructure and strengthening of metals, alloys, and composites manufactured by WAAM; and reduction of defects encountered in WAAM (e.g., porosity and heat-affected zones).

In an embodiment, a method for performing WAAM comprises providing a MSU-WAAM as disclosed herein and using it to perform the WAAM with the multidirectional synchronized ultrasonic device 130 providing multidirectional ultrasonic cavitation as discussed herein.

In an embodiment, a MSU-WAAM device 100 can be fabricated by installing a multidirectional synchronized ultrasonic device 130 on a WAAM instrument 110. The location of the multidirectional synchronized ultrasonic device 130 can be at the nozzle 125 (e.g., disposed over the nozzle 125, with a tip of the nozzle 125 protruding out of the normal probe 141) of the wire feeder.

The principle of the MSU-WAAM device/method can be explained as follows. Ultrasonic waves transmitted by each probe induce the occurrence of cavitation and acoustic streaming patterns. The acoustic streaming is strong enough to affect the shape of the deposited material and shape it in all three directions—top and both lateral sides. In addition to the effect of the ultrasonic waves on the external shape of the deposited material, a consolidating effect on the microstructure is also achieved.

Certain aspects of U.S. Pat. No. 10,941,464 may be relevant to certain aspects of embodiments of the subject invention, and U.S. Pat. No. 10,941,464 is hereby incorporated by reference herein in its entirety. The subject invention was developed based on a significant amount of research and development and materials testing on WAAM-ed components. The developed expertise in ultrasonic cavitation and WAAM led to the concepts of non-contact, multidirectional ultrasonication during WAAM.

Embodiments of the subject invention can lead to the expansion of the use of WAAM printing in industry. The control of the geometry of the deposited material by ultrasonic waves can allow for reduction of the excess of wasted material during WAAM processing and production of near net shape components. This can eliminate or reduce the need for auxiliary processes used in the classical WAAM process, such as the compression roller, and multiple finishing passes by machining. Embodiments of the subject invention can be used in, for example, all sectors that use 3D metal printing, including but not necessarily limited to aerospace, aeronautics, automotive, naval, and health applications such as implants and prostheses. The production of near-net-shape components can reduce manufacturing time and cost as well as material waste.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A multidirectional synchronized ultrasonic device to assist wire arc additive manufacturing (WAAM), the multidirectional synchronized ultrasonic device comprising:

a frame comprising a collar, a first curved section extending from the collar, and a second curved section extending from the collar;

a normal ultrasonic probe connected to the collar and configured to be coaxial with a nozzle of a WAAM robotic arm that comprises the nozzle; and a plurality of lateral ultrasonic probes comprising a first lateral ultrasonic probe disposed on the first curved section of the frame and a second lateral ultrasonic probe disposed on the second curved section of the frame, each lateral ultrasonic probe of the plurality of ultrasonic probes being disposed such that it is not coaxial with the normal ultrasonic probe, the multidirectional synchronized ultrasonic device being configured to be disposed over at least a portion of the nozzle of the WAAM robotic arm, and the frame being configured to rotate about a central axis of the normal ultrasonic probe.

2. The multidirectional synchronized ultrasonic device according to claim 1, the frame being configured to further rotate within a plane in which the central axis of the normal ultrasonic probe lies.

3. The multidirectional synchronized ultrasonic device according to claim 1, the first curved section of the frame and the second curved section of the frame each having a parabolic shape.

4. The multidirectional synchronized ultrasonic device according to claim 1, the first lateral ultrasonic probe being disposed such that its central axis is perpendicular to that of the normal ultrasonic probe.

5. The multidirectional synchronized ultrasonic device according to claim 4, the second lateral ultrasonic probe being disposed such that its central axis is perpendicular to that of the normal ultrasonic probe and parallel to that of the first lateral ultrasonic probe.

6. The multidirectional synchronized ultrasonic device according to claim 1, the plurality of lateral ultrasonic probes further comprising a third lateral ultrasonic probe disposed on the first curved section of the frame and a fourth lateral ultrasonic probe disposed on the second curved section of the frame.

7. The multidirectional synchronized ultrasonic device according to claim 6, a distance between the first lateral ultrasonic probe and the third lateral ultrasonic probe being the same as a distance between the second lateral ultrasonic probe and the fourth lateral ultrasonic probe.

8. The multidirectional synchronized ultrasonic device according to claim 6, the plurality of lateral ultrasonic probes further comprising a fifth lateral ultrasonic probe disposed on the first curved section of the frame and a sixth lateral ultrasonic probe disposed on the second curved section of the frame.

9. The multidirectional synchronized ultrasonic device according to claim 8, the first lateral ultrasonic probe being disposed between the third lateral ultrasonic probe and the fifth lateral ultrasonic probe on the first curved section of the frame, the second lateral ultrasonic probe being disposed between the fourth lateral ultrasonic probe and the sixth lateral ultrasonic probe on the second curved section of the frame, and a distance between the first lateral ultrasonic probe and the third lateral ultrasonic probe being the same as a distance between the second lateral ultrasonic probe and the fourth lateral ultrasonic probe, a distance between the first lateral ultrasonic probe and the fifth lateral ultrasonic probe, and a distance between the second lateral ultrasonic probe and the sixth lateral ultrasonic probe.

10. The multidirectional synchronized ultrasonic device according to claim 1, the normal ultrasonic probe and each lateral ultrasonic probe of the plurality of lateral ultrasonic probes each comprising a transducer in operable communication with an ultrasonic power source.

11. The multidirectional synchronized ultrasonic device according to claim 10, each transducer being configured to be controlled by the ultrasonic power source with a power in a range of from 700 Watts (W) to 2000 W and a frequency in a range of from 18 kilohertz (kHz) to 20 kHz.

12. The multidirectional synchronized ultrasonic device according to claim 10, each transducer being configured to be operated by the ultrasonic power source in a first mode of being switched on continuously and a second mode of being pulsed on and off in repetitive cycles.

13. A WAAM device, comprising:
a WAAM robotic arm comprising a nozzle; and
the multidirectional synchronized ultrasonic device according to claim 1 disposed over at least a portion of the nozzle.

14. A WAAM device, comprising:
a WAAM robotic arm comprising a nozzle; and
the multidirectional synchronized ultrasonic device according to claim 10 disposed over at least a portion of the nozzle.

15. A method of performing wire arc additive manufacturing (WAAM), the method comprising:
providing the WAAM device according to claim 14;
printing a metal through the nozzle using the WAAM robotic arm, the metal forming a molten metal pool as it exits the nozzle; and
operating, via the ultrasonic power source, the transducers of the normal ultrasonic probe and each lateral ultrasonic probe of the plurality of lateral ultrasonic probes to generate ultrasonic waves and cavitation on the molten metal pool.

16. The method according to claim 15, the operating of the transducers comprising controlling, via the ultrasonic power source, the transducers with a power in a range of from 700 Watts (W) to 2000 W and a frequency in a range of from 18 kilohertz (kHz) to 20 kHz.

17. The method according to claim 15, the operating of the transducers comprising operating, via the ultrasonic power source, the transducers in a first mode of being switched on continuously and a second mode of being pulsed on and off in repetitive cycles.

18. The method according to claim 15, further comprising rotating the frame to move the plurality of lateral ultrasonic probes with respect to the molten metal pool.

19. A multidirectional synchronized ultrasonic device to assist wire arc additive manufacturing (WAAM), the multidirectional synchronized ultrasonic device comprising:
a frame comprising a collar, a first curved section extending from the collar, and a second curved section extending from the collar;
a normal ultrasonic probe connected to the collar and configured to be coaxial with a nozzle of a WAAM robotic arm that comprises the nozzle; and
a plurality of lateral ultrasonic probes comprising a first lateral ultrasonic probe disposed on the first curved section of the frame and a second lateral ultrasonic probe disposed on the second curved section of the frame,
each lateral ultrasonic probe of the plurality of ultrasonic probes being disposed such that it is not coaxial with the normal ultrasonic probe,
the device being configured to be disposed over at least a portion of the nozzle of the WAAM robotic arm,
the frame being configured to rotate about a central axis of the normal ultrasonic probe,
the frame being configured to further rotate within a plane in which the central axis of the normal ultrasonic probe lies,
the first curved section of the frame and the second curved section of the frame each having a parabolic shape,
the first lateral ultrasonic probe being disposed such that its central axis is perpendicular to that of the normal ultrasonic probe,
the second lateral ultrasonic probe being disposed such that its central axis is perpendicular to that of the normal ultrasonic probe and parallel to that of the first lateral ultrasonic probe,
the plurality of lateral ultrasonic probes further comprising a third lateral ultrasonic probe disposed on the first curved section of the frame, a fourth lateral ultrasonic probe disposed on the second curved section of the frame, a fifth lateral ultrasonic probe disposed on the first curved section of the frame, and a sixth lateral ultrasonic probe disposed on the second curved section of the frame,
the first lateral ultrasonic probe being disposed between the third lateral ultrasonic probe and the fifth lateral ultrasonic probe on the first curved section of the frame,
the second lateral ultrasonic probe being disposed between the fourth lateral ultrasonic probe and the sixth lateral ultrasonic probe on the second curved section of the frame,
a distance between the first lateral ultrasonic probe and the third lateral ultrasonic probe being the same as a distance between the second lateral ultrasonic probe and the fourth lateral ultrasonic probe, a distance between the first lateral ultrasonic probe and the fifth lateral ultrasonic probe, and a distance between the second lateral ultrasonic probe and the sixth lateral ultrasonic probe,
the normal ultrasonic probe and each lateral ultrasonic probe of the plurality of lateral ultrasonic probes each comprising a transducer in operable communication with an ultrasonic power source,
each transducer being configured to be controlled by the ultrasonic power source with a power in a range of from 700 Watts (W) to 2000 W and a frequency in a range of from 18 kilohertz (kHz) to 20 kHz, and
each transducer being configured to be operated by the ultrasonic power source in a first mode of being switched on continuously and a second mode of being pulsed on and off in repetitive cycles.

20. A WAAM device, comprising:
a WAAM robotic arm comprising a nozzle; and
the multidirectional synchronized ultrasonic device according to claim 19 disposed over at least a portion of the nozzle.

* * * * *